(12) United States Patent
Vaculin et al.

(10) Patent No.: US 12,282,925 B2
(45) Date of Patent: Apr. 22, 2025

(54) MULTI-PHASE PRIVACY-PRESERVING INFERENCING IN A HIGH VOLUME DATA ENVIRONMENT

(71) Applicant: International Business Machines Corporation, Armonk, NY (US)

(72) Inventors: Roman Vaculin, Larchmont, NY (US); Kanthi Sarpatwar, Elmsford, NY (US); Hong Min, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 17/315,409

(22) Filed: May 10, 2021

(65) Prior Publication Data
US 2022/0374904 A1    Nov. 24, 2022

(51) Int. Cl.
*G06Q 40/00*    (2023.01)
*G06N 5/04*    (2023.01)
(Continued)

(52) U.S. Cl.
CPC ........... *G06Q 20/4016* (2013.01); *G06N 5/04* (2013.01); *G06N 20/00* (2019.01)

(58) Field of Classification Search
CPC ....... G06Q 20/4016; G06N 20/00; G06N 5/04
See application file for complete search history.

(56) References Cited

U.S. PATENT DOCUMENTS 9,996,837 B2    6/2018    Siddens et al.
10,062,078 B1 *    8/2018    Boates ............... G06Q 20/4016
(Continued)

FOREIGN PATENT DOCUMENTS

| CN | 113935495 | * | 1/2021 | ............. G06Q 40/02 |
| CN | 115062331 | * | 9/2022 | ......... G06F 21/6245 |

(Continued)

OTHER PUBLICATIONS

Sarpatwar et al., "Privacy Enhanced Decision Tree Inference," CVPR 2020, Computer Vision Foundation, 2020 (Year: 2020).*
(Continued)

*Primary Examiner* — Abhishek Vyas
*Assistant Examiner* — William B. Bunker
(74) *Attorney, Agent, or Firm* — Rakesh Roy

(57) ABSTRACT

A method, apparatus and computer program product that provides multi-phase privacy-preserving inferencing in a high throughput data environment, e.g., to facilitate fraud prediction, detection and prevention. In one embodiment, two (2) machine learning models are used, a first model that is trained in the clear on first transaction data, and a second model that is trained in the clear but on the first transaction data, and user data. The first model is used to perform inferencing in the clear on the high throughput received data. In this manner, the first model provides a first level evaluation of whether a particular transaction might be fraudulent. If a transaction is flagged in this first phase, a second more secure inference is then carried out using the second model. The inferencing performed by the second model is done on homomorphically encrypted data. Thus, only those transactions marked by the first model are passed to the second model for secure evaluation.

18 Claims, 4 Drawing Sheets

(51) Int. Cl.
*G06N 20/00* (2019.01)
*G06Q 20/40* (2012.01)

(56) References Cited

U.S. PATENT DOCUMENTS

| | | | | |
|---|---|---|---|---|
| 10,108,962 | B1* | 10/2018 | Sadaghiani | G06N 20/20 |
| 2011/0004498 | A1* | 1/2011 | Readshaw | G06Q 20/24 |
| | | | | 705/318 |
| 2016/0182226 | A1* | 6/2016 | Yasuda | H04L 9/0869 |
| | | | | 380/28 |
| 2017/0053282 | A1* | 2/2017 | Olumofin | G06Q 20/3224 |
| 2017/0288856 | A1* | 10/2017 | Payton | H04L 9/14 |
| 2019/0228419 | A1* | 7/2019 | Sampath | G06N 5/025 |
| 2020/0244435 | A1* | 7/2020 | Shpurov | H04L 9/3239 |
| 2020/0294056 | A1* | 9/2020 | Patel | G06Q 20/3821 |
| 2020/0320619 | A1 | 10/2020 | Motaharian et al. | |
| 2021/0049606 | A1 | 2/2021 | Garcia et al. | |
| 2021/0097545 | A1 | 4/2021 | Laptiev et al. | |
| 2022/0075878 | A1* | 3/2022 | Begg | G06F 21/6245 |
| 2022/0109654 | A1* | 4/2022 | Fink | G06N 3/08 |
| 2022/0188837 | A1* | 6/2022 | Assefa | G06N 5/01 |
| 2022/0245641 | A1* | 8/2022 | Wintle | G06Q 20/405 |

FOREIGN PATENT DOCUMENTS

| | | | | |
|---|---|---|---|---|
| IN | 202011036221 A | | 9/2020 | |
| IN | 202041034119 A | | 9/2020 | |
| KR | 10-2448625 | * | 9/2022 | G06Q 20/32 |

OTHER PUBLICATIONS

Saia et al., "Multiple Behavioral Models: A Divide and Conquer Strategy to Fraud Detection in Financial Data Streams," 7th International Conference on Knowledge Discovery, Knowledge Engineering, and Knowledge Management, 2015. (Year: 2015).*
Tueno et al., "Non-Iterative Private Decision Tree Evaluation," International Federation for Information Processing, 2020 (Year: 2020).*
Zihao et al., "Practical Secure Computations Outsourcing: A Survey," ACM Computing Surveys, vol. 51, No. 2, 2018 (Year: 2018).*
Phong et al., "Privacy-Preserving Deep Learning via Additively Homomorphic Encryption," IEEE Transactions on Information Forensics and Security, vol. 13, No. 5 2018 (Year: 2018).*
Liu et al., "Towards Practical Privacy Preserving Decision Tree Training and Evaluation in the Cloud," IEEE Transactions on Information Forensics and Security, vol. 15 2020 (Year: 2020).*
Canillas, et al., "Exploratory Study of Privacy Preserving Fraud Detection," Middleware '18 Industry, Dec. 2018.
Huntsman, "Fraud Prevention and I.T. Security," 2015.
George et al., "Fraud detection and mitigation in secure e-payment transaction," International Journal of Scientific & Engineering Research, vol. 6, Issue 2, Feb. 2015.
Anonymous, "Generating Travel Itineraries Based on User Interests," IPCOM000252013D, Dec. 13, 2017.
Anonymous, "Machine Learning to Automatically Lock Device Screen at Opportune Time," IPCOM000252082D, Dec. 15, 2017.
Anonymous, "Deep learning and Cognitive analysis based enhanced cheque validation and fraud detection," IPCOM000259429D, Aug. 12, 2019.
Leverage, "Identity protection and fraud detection for member security," 2016.

* cited by examiner

MULTI-PHASE PRIVACY-PRESERVING INFERENCING IN A HIGH VOLUME DATA ENVIRONMENT

BACKGROUND OF THE INVENTION

Technical Field

This disclosure relates generally to AI-based privacy-preserving inferencing, e.g., to support fraud prediction, detection and prevention, in a high throughput transaction processing environment.

Background of the Related Art

There are many operating environments wherein protecting return on investment (ROI) depends on detecting fraud in real-time. Credit card authorization is the most common example. Predicting fraud, however, is quite challenging, as the rarity of fraudulent activity creates imbalanced data sets that make training a machine learning (ML) model difficult. Moreover, today's fast transaction times and ever-evolving fraudster schemes make it increasingly difficult to immediately identify, predict, counteract and recover. And, the cost of fraud is quite high, as false positives require costly manual investigations, with ROI negatively impacted through loss payouts and damaged public image. This problem is exacerbated as service level requirements (e.g., number of transactions per second, and acceptable latency) continue to become more stringent.

In a typical credit card fraud detection scenario, transactions arrive at an extremely high rate (e.g., tens of thousands per second), and each transaction is then evaluated against a machine learning (ML) model that has been trained to predict potential fraud. The accuracy of the model of course depends on the data used for its training, and theoretically a high accuracy model may be realized if private user profiles and card transaction information could be leveraged for such training. Such user and transaction information, however, is typically unavailable in unencrypted form.

Homomorphic encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. While an HE-based scheme might be useful to facilitate training of a ML model using encrypted user profile and card information, it is not possible to apply homomorphic inference directly on a high-accuracy model trained in such a manner due to the high transaction data volume itself.

The techniques of this disclosure provide a solution to this problem.

BRIEF SUMMARY

This disclosure provides a method, apparatus and computer program product that implements multi-phase inferencing in a privacy-preserving manner in a high throughput data processing environment. A representative operating environment is a credit card transaction processing environment in which it is desired to provide fraud prediction, detection and prevention. In one embodiment, two (2) machine learning models are used, a first ML model that preferably is trained in the clear on a corpus of non-private transaction data, and a second model that preferably is trained in the clear on both the transaction data, as well as on sensitive (e.g., private user) data. Thus, the first and second models are trained on different feature sets, with the second model (in this example embodiment) being the only one leveraging the private user data. Once trained, the first and second models are then used in a two-phase inferencing detection flow against a stream of transactions that are arriving, e.g., for fraud evaluation. In the first phase, the first model is used to perform inferencing in the clear on the high throughput received data. In this manner, the first model provides a first level evaluation of whether a particular transaction might be fraudulent. If a transaction is flagged in this first phase as possibly fraudulent, a second more secure inference is then carried out in a second phase and using the second model that has been trained in part using the private user data. The inferencing performed by the second model, however, is not performed in the clear but rather is preferably done on encrypted data, e.g., homomorphically-encrypted data. Only when a transaction is tagged as potentially fraudulent by both the first and second models is the transaction flagged.

In this approach, only those transactions marked by the first model are passed to the second model for secure evaluation. Because only a small fraction of the transactions are marked in the phase as potentially fraudulent, full privacy preserving inferencing is realized even at high transaction volumes.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
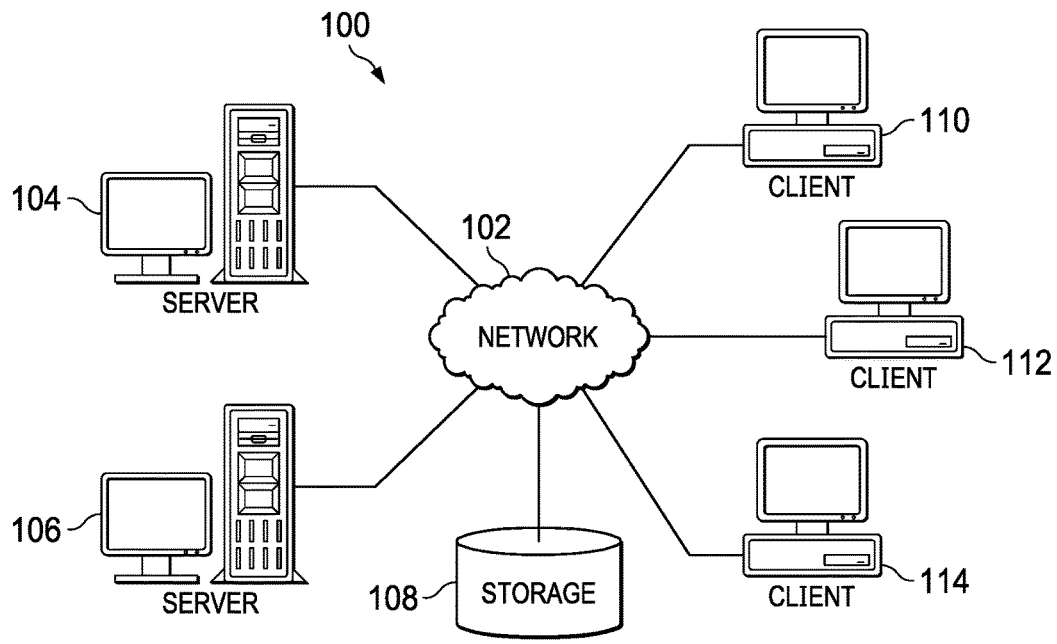
FIG. 1 depicts an exemplary block diagram of a distributed data processing environment in which exemplary aspects of the illustrative embodiments may be implemented.
Figure 2:
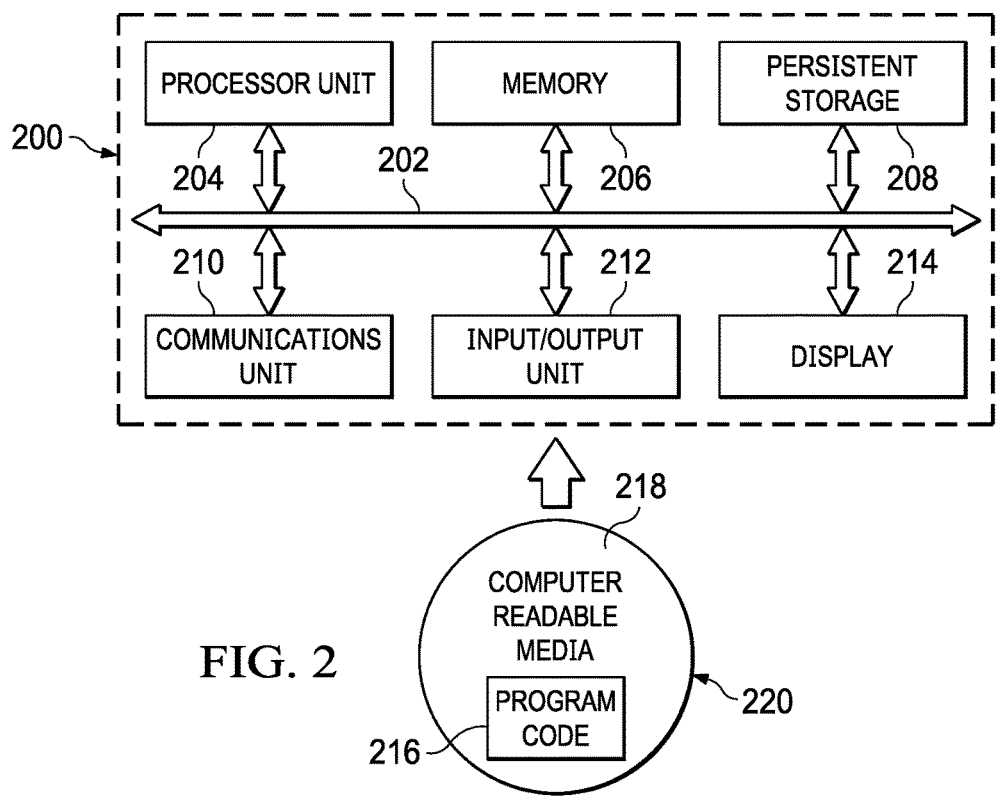
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-server technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In Particular, the Following are Typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models Typically are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models Typically are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
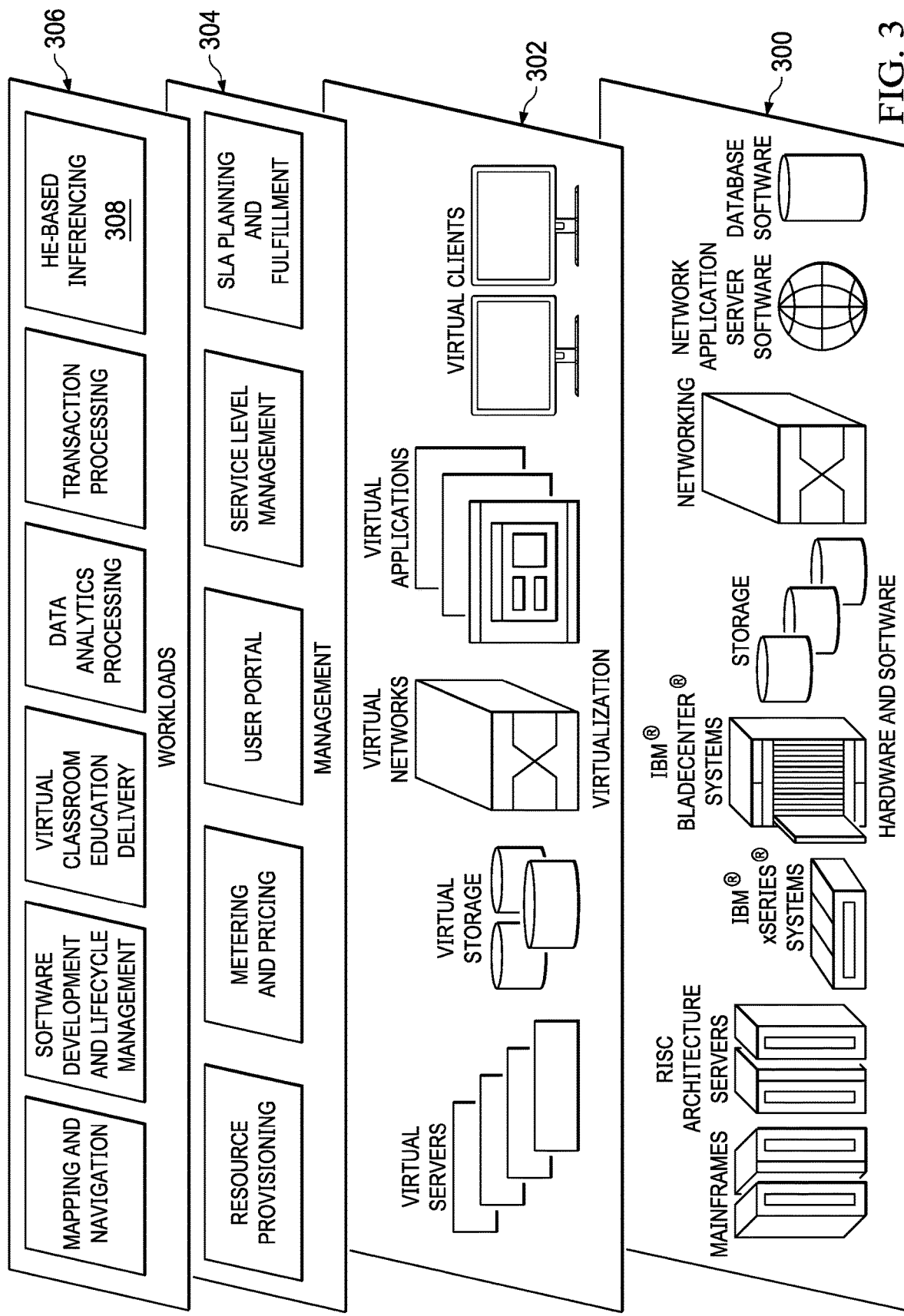
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include the following: mapping and navigation; software development and lifecycle management; virtual classroom education delivery; data analytics processing; transaction processing; enterprise-specific functions in a private cloud; and, according to this disclosure, a technique for secure credit card fraud detection 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, New York In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

The above-described commercial implementation is not intended to be limited, but rather is simply one representative embodiment of a client application supported in a cloud computing environment and that interacts with a cognitive service.

Homomorphic Encryption

By way of further background, Homomorphic Encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. FHE is often achieved by employing a somewhat homomorphic (SWHE) or leveled HE scheme in combination with a bootstrapping or re-encryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. While this ciphertext packing enables parallelization of addition and multiplication operations, it is not possible to randomly access values in the individual slots of the ciphertext after packing. Rather, only limited operations, e.g., rotation of the slots within the ciphertext, are possible.

When the CKKS scheme (as implemented in the HELib library) for HE operations, real-valued features may be input to the decision tree directly, i.e., there is no requirement to transform the inputs as integers.

Machine Learning-as-a-Service Using Homomorphic Encryption

Machine Learning as a Service (MLaaS) is now a popular paradigm, where pre-trained models are hosted on a public cloud and inference is performed on a pay-per-query basis. The use of MLaaS, however, is restricted in many application domains (e.g., financial services, healthcare) because the privacy (confidentiality) of the client data on which the inference is performed is of utmost concern. Fully homomorphic encryption (FHE) can solve the above privacy conundrum by allowing certain types of computations on encrypted data without the need for decryption. As noted above, an FHE scheme can be defined as: $H=(\varepsilon, \mathcal{D}, \lambda, EV AL)$, where $\varepsilon$ and $\mathcal{M}$ represent encryption and decryption operations, respectively, $\lambda$ is the security parameter, and EV AL is the evaluate function, which takes an arbitrary function f and an encrypted input $\varepsilon$ (I) and returns the encrypted result $EV AL(f, \varepsilon (I))=\varepsilon (f(I))$. For ease of presentation, it is understood that the $\varepsilon$ and EV AL operations require access to the public key and $\mathcal{D}$ needs access to the private key.

Figure 4:
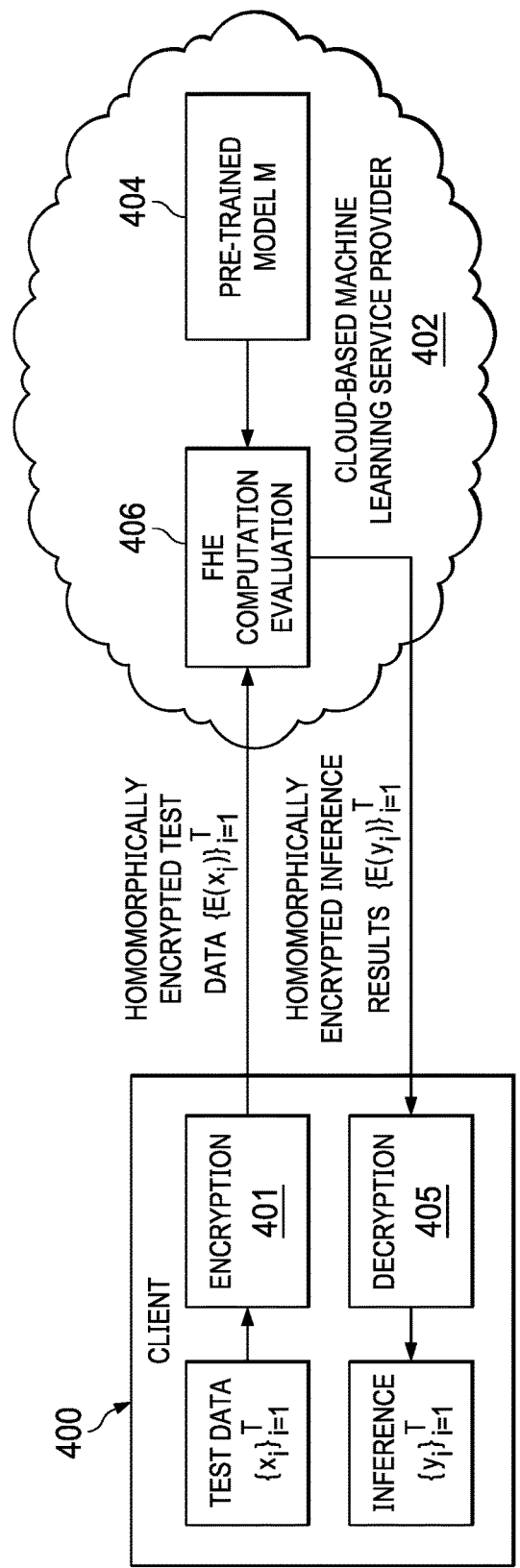
FIG. 4 depicts a Machine Learning as-a-service (MLaaS) operating environment in which the techniques of this disclosure may be implemented.

With reference now to FIG. 4, an FHE-based privacy-preserving inference scenario is depicted and works as follows. The client 400 encrypts its data x (using encryption function 401) and sends the encrypted data $\varepsilon$ (x) to the cloud-based machine learning service provider 402. The service provider, who holds a pre-trained model 404 $\mathcal{M}_\theta$ (where $\mathcal{M}$ and $\theta$ denote the model architecture and parameters, respectively), performs inference computation in the encrypted domain ($\varepsilon(y)=EV AL(\mathcal{M}_\theta, \varepsilon(x))$), and returns the encrypted result back to the client 400 for decryption 405. Because the service provider does not gain any knowledge about the input (x) or the resulting output (y), complete client data privacy is guaranteed. Furthermore, the above-described scenario is referred to as non-interactive because it involves only a single round of communication between the client and the service provider.

With the above as background, the technique of this disclosure is now described.

Securely Leveraging User Data for Privacy-Preserving Inferencing

As will be described, the techniques herein provide for multi-phase (e.g., two-step) inferencing in a privacy-preserving manner, with at least a first inference processing very high throughput data unencrypted, and at least a second inference then being carried out at a relatively much smaller throughput but incorporating private data (e.g., sensitive user data, encrypted using FHE) to improve the overall results. For descriptive purposes, this technique is now described in an example application, namely, fraud prediction, detection and prevention, but this example use case is not intended to be limiting. The same basic multi-phase inferencing technique is useful for any transaction processing (or other computing) system having an execution environment that ensures the integrity, availability and security of data, with fast response times and high transaction throughput.

Figure 5:
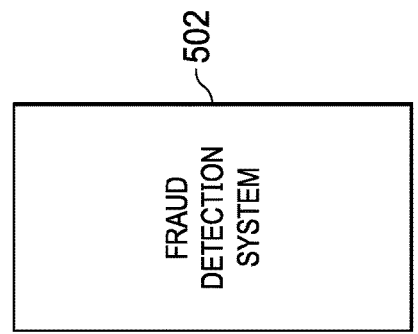
FIG. 5 depicts a representative use case involving a detection system that receives in real-time a stream of transaction data for which fraud detection is carried out.
Figure 5:
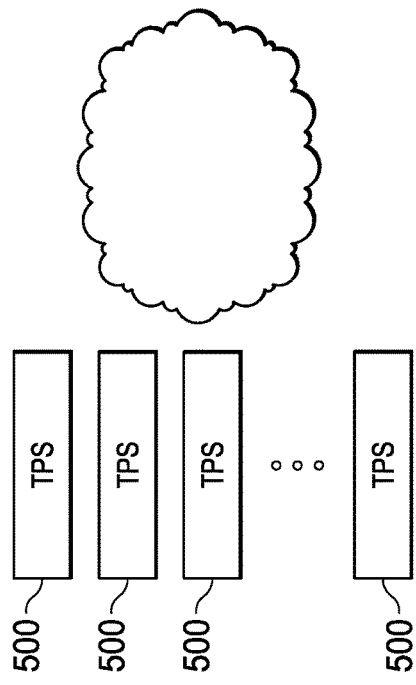

FIG. 5 depicts an operating environment for fraud prediction, detection and prevention and in which the techniques of this disclosure may be practiced. As noted above, a particular use case that can benefit from the multi-phase inferencing involves credit card fraud detection, wherein the system is designed to receive and validate transaction data, preferably as the transactions themselves are occurring at the various points-of-sale/use. Thus, and as shown, numerous transaction processing systems 500 are querying a detection system 502, with a particular query being associated with one or more actual attempted credit card transactions that are occurring in real-time and that require validation (against potential fraud). In this embodiment, it is assumed that a very large of transactions (e.g., tens of thousands/second) are arriving at the detection system, and that the detection system has a service level requirement that dictates a response (e.g., "fraud" or "safe") with very low latency or perceived latency at the point-of-sale/use of the card. The detection system 502 may operate as a cloud-accessible service, such as previously described in connection with FIG. 3. As noted above, the detection system 502 may be operated in association with one or more transaction processing (or other computing) systems, or be operated as a service in connection therewith. The detection system 502 may have associated therewith other administrative, management or reporting systems, e.g., that provide notification, alerting, logging, mitigation, and the like, once a potential fraudulent transaction is flagged. The detection system may be implemented as one or more applications executing on one or more computing platforms, such as described above with respect to FIG. 2.

Figure 6:
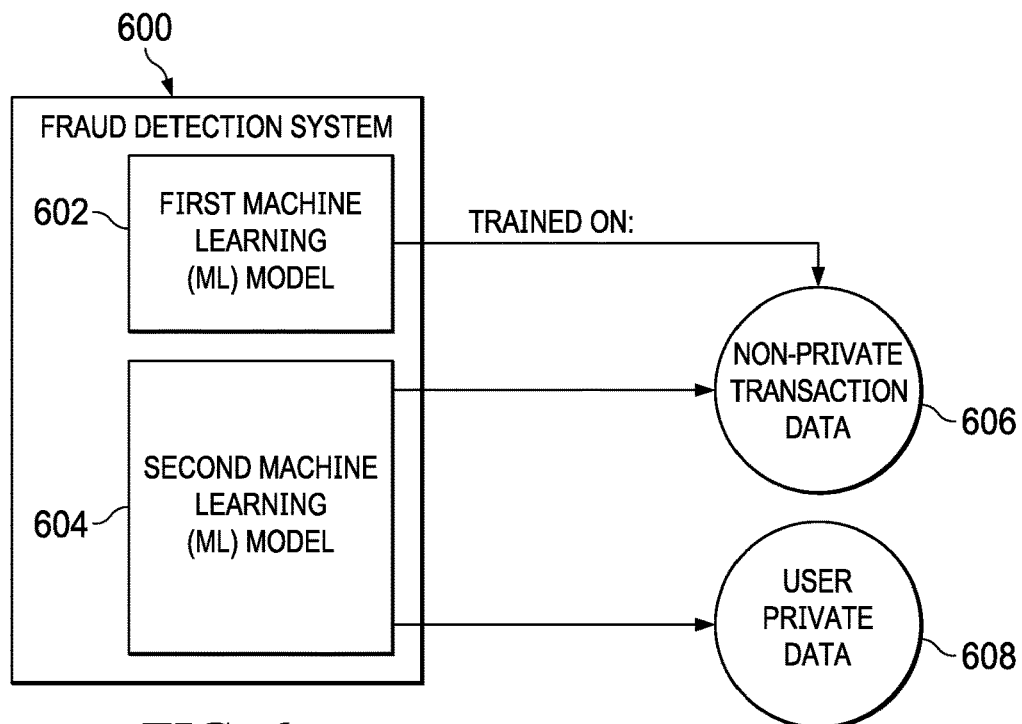
FIG. 6 depicts how first and second machine learning models are trained according to an embodiment of this disclosure.

As shown in FIG. 6, and according to this disclosure, the detection system 600 comprises a first machine learning model 602, and a second machine learning model 604. These models are trained in a set-up (training) phase, which occurs off-line or out-of-band with respect to the actual transaction flow. Once trained, the models are then used for inferencing, preferably in real-time and against the actual transaction data that is arriving at the detection system.

As depicted in FIG. 6, in this example fraud detection use case, the first machine learning model 602 preferably is trained on a corpus of available non-private (non-sensitive) transaction data 606. Without limitation, the transaction data 606 used to train the first ML model 602 comprises, for each transaction, one or more of the following: user, card, year, month, day, time, amount, use chip, merchant name, merchant city, merchant state, zip, Merchant Category Code (MCC), and the like. Training of the first data model may occur in the clear. The second machine learning model 604, in contrast, is trained on such non-sensitive transaction data 606 together with private user profile data 608. The transaction data 606 used to train the second model may be the same or different transaction data as used to train the first model 602. In this example use case, only the second data model 604, however, is also trained using the private user profile data 608, which data is highly sensitive and thus needs to be secured (encrypted) at all times. Without limitation, the user profile data 608 comprises, for each user, one or more of: card brand, card type, card number, expires, CVV, has chip, cards issued, balance, credit limit, account open data, last fraudulent use, year PIN last changed, card on dark web indication, lifetime transactions, fraudulent transactions, and the like. Although the user profile data itself needs to remain encrypted, the training itself of the second data model may also occur in the clear.

Generalizing, the first ML model is trained using first training data, while typically the second ML model is trained using the first training data augmented with additional private data (e.g., private user profiles). Because only the second data model is trained using the private user data, the first and second models 602 and 604 are trained on different feature sets. Training may be repeated periodically or as new training data sets are obtained and available to the system.

Figure 7:
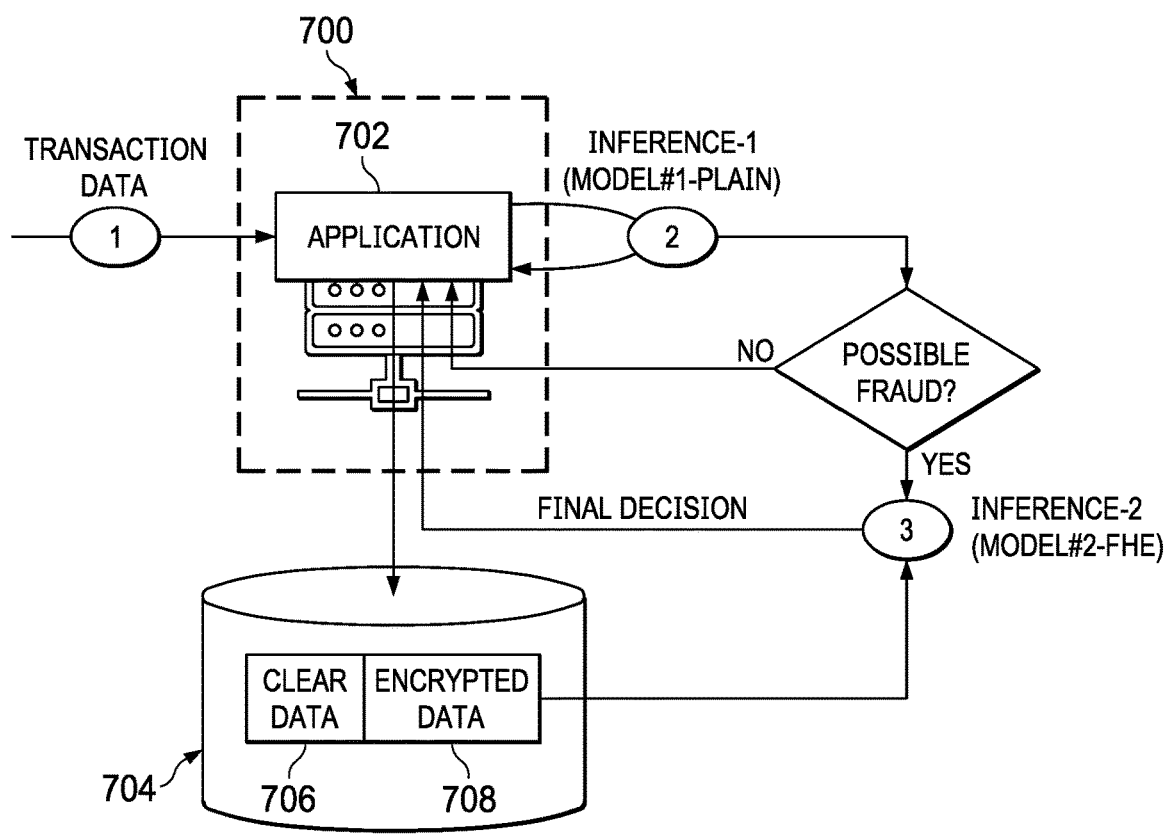
FIG. 7 depicts a two-phase inference flow that is implemented using the first and second models according to this disclosure.

FIG. 7 depicts a two-phase inference flow that is then implemented according to this example embodiment, wherein the multi-phase inferencing approach of this disclosure is used for credit card fraud detection. In this embodiment, a computing system 700 hosts application 702 that provides the fraud detection, and the computing system 700 has associated therewith 704 a database 706 of the non-private transaction data 708, and the private user data 710. Typically, the database 706 that stores the private user data 710 may be hosted on other servers, even those in potentially untrusted environments. As depicted, the transaction data (from the transaction processing systems, not shown) arrives at step (1), preferably in real-time. The basic fraud detection operation, which preferably is carried out on a transaction-by-transaction basis, uses the first model at step (2) to determine whether a possible fraud exists. If not, the application 702 takes no action. If, however, the outcome of the "possible fraud?" test is positive, control moves to step (3), by which the application 702 applies fully homomorphic encryption (FHE)-based inferencing against additional encrypted data 710 stored in the database 706 to make a final decision on whether the transaction should be tagged as fraudulent. The FHE techniques described in FIG. 4 above may be used for this purpose.

More formally, and once again with reference to FIG. 7, at step (1) transaction $T_i$ arrives. At step (2), the application 702 applies the first model $M_{i1}$ on $T_i \rightarrow$ the first inference regarding possible fraud. At step (3), and if $M_{i1}(T_i)=$ FRAUD, control continues to step (4). At this step, the application 702 queries encrypted user data $U_i$ for the transaction $T_i$, where $U_i$ is the user data and $T_i$ is the transaction data. The second model $M_2$ is applied on $T_i+U_i \rightarrow$ FHE inference on $M_2$. If $M_2(T_i+U_i)=$ FRAUD, the application reports fraud and processing is completed.

The above-described two-phase inference flow provides significant advantages, as it enables the application to apply inferencing, e.g., FHE directly and using a high-accuracy model (trained on both transaction and private user data), even with respect to high volume transaction data arriving in real-time and with respect to data stored in encrypted form on potentially untrusted environments. In a representative example operating scenario, the application models are trained and the inferencing support provided in an deep learning platform, such as IBM® Watson® Machine Learning Accelerator (WML). Transactions are assumed to be flowing in to the system at a high rate (e.g., 30-60,000 per second). In a typical scenario of this type, only a small percentage of the transactions (e.g., about 100 TPS) are labeled as potentially fraudulent. Thus, FHE inferencing only needs to handle a workload of this magnitude. This workload is feasible using existing FHE models (e.g., logistic or linear regression) and multi-threaded resources.

Generalizing, one skilled in the art will appreciate that there are many other types of use cases that can benefit from the two-phase inferencing of this disclosure wherein a first model that is trained on non-private data is used in a first level determination that identifies a relatively small subset of suspect data, which subset is then further inference (preferably homomorphically) to provide the final, second level detection decision. Stated another way, the first phase inferencing provides a coarse level detection, while the second phase inferencing provides a fine-grained decision. This two-level approach provides significant processing advantages, as it is expected that the number of transactions that are expected to pass through the first level filter are relatively small in number (or percentage); thus, the actual resources that are needed for the much more computationally-intensive homomorphic inference are limited. Thus, the overall resource consumption of the system as a whole is reduced, even as the transaction volume may increase.

Other example techniques that may benefit from this privacy-preserving inferencing approach include, without limitation, online reservation and ordering systems, logging systems, database and information management systems, intrusion and anomaly detection systems, identity and access management systems, cybersecurity systems, and other cloud-based systems, and others. There is no limitation on potential use cases, as the technique may be used to support any application or service that receives and processes high volume data while complying with privacy regulations, compliance or other security requirements. Many new industry applications may use this type of cloud-based detection service and thus provide enhanced privacy guarantees. Other examples are healthcare, banking, finance, marketing and finance, where compliance with respect to client privacy is paramount or otherwise required. More generally, the approach may be used for any application that involves scoring or inferencing private data.

As described, typically a computing system that implements this approach is implemented in software, e.g., as a set of computer program instructions executed by one or more hardware processors. A particular tool or component in the system may comprise any number of programs, processes, execution threads, and the like, together with appropriate interfaces and databases to support data used or created by the tool or component. The tool or component may be configured or administered with a web-based front-end, via a command line, or the like. The tool or component may include one or more functions that are implemented programmatically, or that interoperate with other computing entities or software systems via an application programming interface (API), or any convenient request-response protocol.

Any references herein to one or more commercial products or services are exemplary and should not be taken to limit the disclosed technique, which may be implemented on any system, device, appliance (or, more generally, machine) having the general characteristics and operating functionality that has been described.

As noted, one preferred implementation of this subject matter is as-a-service, but this is not a limitation either. The HE-based inferencing portion of the technique may be carried out entirely on-premises or in a standalone operating environment. As previously noted, and without limitation, the subject matter may be implemented within or in association with a cloud deployment platform system or appliance, or using any other type of deployment systems, products, devices, programs or processes. Further, the model building or inferencing system functionality may be provided as a standalone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Further, FHE is just a representative cryptographic protocol, and it is not intended to be limited. Moreover, while the second phase inferencing preferably occurs using an FHE protocol, the approach herein may be leveraged with other multi-party secure computation techniques that do not require decryption of the user (or other) sensitive data. Alternatives to FHE include, e.g., security enclave-based cryptography, quantum-safe encryption, Yao garbled circuits, and others.

The techniques herein provide for improvements to another technology or technical field, namely, fraud detection systems, and cloud-based detection systems that incorporate or expose such technologies.

The particular use case or application for which the framework is being used in not a limitation of this disclosure.

While the above-described scheme typically uses two phases, this is not a limitation, as additional (and hierarchical) levels of discrimination may be implemented.

Having described the subject matter, what is claimed is as follows:

1. A method to perform privacy-preserving inferencing to detect fraud in real-time financial transactions, comprising:
providing at least one server in electronic communication with at least one client computing device using an electronic communication network to provide an online machine learning fraud detection service to the at least one client computing device,
wherein the at least one client computing device comprises a transaction processing system to process real-time financial transactions at a high volume rate, wherein the real-time financial transactions are associated with at least one payment card account of a user of the at least one client computing device such that the at least one client computing device maintains a private user profile associated with the at least one payment card account of the user, wherein the real-time financial transactions are represented by non-private transaction data provided by the at least one client computing device,
wherein the at least one server has electronic access to the non-private transaction data and to a database storing encrypted private user profile data, wherein the online machine learning fraud detection service is implemented in an untrusted environment with respect to the encrypted private user profile data,
wherein the online machine learning fraud detection service comprises at least one processor configured to execute a first machine learning model and a second machine learning model for inferencing real-time fraud detection associated with the real-time financial transactions using different feature sets, wherein the second machine learning model is configured to implement an algorithm to perform fully homomorphic encryption (FHE)-based inferencing on a relatively small subset of the real-time financial transactions relative to the first machine learning model,
wherein the at least one processor is configured to perform the method, comprising:
receiving the high volume rate of the real-time financial transactions from the at least one client computing device, wherein the real-time financial transactions are associated with corresponding encrypted private user profile data stored in the database;
performing, for respective transactions of the real-time financial transactions, a first inferencing using the first machine learning model that is trained on the non-private transaction data provided by the at least one client computing device;
detecting, based on the first inferencing using the first machine learning model, that a given financial transaction in the real-time financial transactions needs additional fraud evaluation;
accessing from the database the encrypted private user profile data associated with the given transaction;
performing, for the given financial transaction that needs the additional fraud evaluation, a second inferencing in real-time using the second machine learning model,
wherein the second machine learning model is trained on training non-private transaction data augmented with training encrypted private user profile data, wherein the second inferencing includes the FHE-based inferencing that analyzes the given transaction based on the corresponding encrypted private user profile data stored in the database associated with the user associated with the given transaction, wherein the FHE-based inferencing is performed on the given transaction in a privacy-preserving manner such that the online machine learning fraud detection service does not gain any knowledge of the encrypted private user profile data associated with the second inferencing;
transmitting an encrypted output of the FHE-based inferencing to the at least one client computing device;
decrypting, by the at least one client computing device, the encrypted output of the FHE-based inferencing to determine whether the given financial transaction includes a given characteristic based on at least one feature of the second machine learning model associated with the corresponding encrypted private user profile data; and
flagging the given financial transaction based on determining that the given characteristic indicates a fraudulent transaction.

2. The method as described in claim 1, wherein the real-time financial transactions include credit card transaction data, and wherein the first inferencing determines that the given financial transaction is a likely fraud.

3. The method as described in claim 1, further comprising training the first and second machine learning models.

4. The method as described in claim 1, wherein the encrypted private user profile data is encrypted using a homomorphic encryption scheme.

5. The method as described in claim 4, further comprising:
querying the database storing the encrypted private user profile data;
obtaining a response, wherein the response includes the encrypted private user profile data that does not expose any private user data; and
applying the second machine learning model on the given financial transaction and the response.

6. The method as described in claim 1, wherein the first inferencing identifies a fraction of the real-time financial transactions against which the second inferencing is applied.

7. A computer system for performing privacy-preserving inferencing to detect fraud in real-time financial transactions, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system further comprises:
at least one server in electronic communication with at least one client computing device using an electronic communication network to provide an online machine learning fraud detection service to the at least one client computing device, wherein the at least one client computing device comprises a transaction processing system to process real-time financial transactions at a high volume rate, wherein the real-time financial transactions are associated with at least one payment card account of a user of the at least one client computing device such that the at least one client computing device maintains a private user profile associated with the at least one payment card account of the user, wherein the real-time financial transactions are represented by non-private transaction data provided by the at least one client computing device, wherein the at least one server has electronic access to the non-private transaction data and to a database storing encrypted private user profile data, wherein the online machine learning fraud detection service is implemented in an untrusted environment with respect to the encrypted private user profile data, wherein the one or more processors of the online machine learning fraud detection service is configured to execute a first machine learning model and a second machine learning model for inferencing real-time fraud detection associated with the real-time financial transactions using different feature sets, wherein the second machine learning model is configured to implement an algorithm to perform fully homomorphic encryption (FHE)-based inferencing on a relatively small subset of the real-time financial transactions relative to the first machine learning model, wherein the computer system is capable of performing a method comprising:

receiving the high volume rate of the real-time financial transactions from the at least one client computing device, wherein the real-time financial transactions are associated with corresponding encrypted private user profile data stored in the database;

performing, for respective transactions of the real-time financial transactions, a first inferencing using the first machine learning model that is trained on the non-private transaction data provided by the at least one client computing device;

detecting, based on the first inferencing using the first machine learning model, that a given financial transaction in the real-time financial transactions needs additional fraud evaluation;

accessing from the database the encrypted private user profile data associated with the given transaction;

performing, for the given financial transaction that needs the additional fraud evaluation, a second inferencing in real-time using the second machine learning model, wherein the second machine learning model is trained on training non-private transaction data augmented with training encrypted private user profile data, wherein the second inferencing includes the FHE-based inferencing that analyzes the given transaction based on the corresponding encrypted private user profile data stored in the database associated with the user associated with the given transaction, wherein the FHE-based inferencing is performed on the given transaction in a privacy-preserving manner such that the online machine learning fraud detection service does not gain any knowledge of the encrypted private user profile data associated with the second inferencing;

transmitting an encrypted output of the FHE-based inferencing to the at least one client computing device;

decrypting, by the at least one client computing device, the encrypted output of the FHE-based inferencing to determine whether the given financial transaction includes a given characteristic based on at least one feature of the second machine learning model associated with the corresponding encrypted private user profile data; and flagging the given financial transaction based on determining that the given characteristic indicates a fraudulent transaction.

8. The computer system for fraud detection as described in claim 7, wherein the real-time financial transactions include credit card transaction data, and wherein the first inferencing determines that the given financial transaction is a likely fraud.

9. The computer system for fraud detection as described in claim 7, further comprising training the first and second machine learning models.

10. The computer system for fraud detection as described in claim 7, wherein the encrypted private user profile data is encrypted using a homomorphic encryption scheme.

11. The computer system for fraud detection as described in claim 10, further comprising:
querying the database storing the encrypted private user profile data;
obtaining a response, wherein the response includes the encrypted private user profile data that does not expose any private user data; and
applying the second machine learning model on the given financial transaction and the response.

12. The computer system for fraud detection as described in claim 7, wherein the first inferencing identifies a fraction of the real-time financial transactions against which the second inferencing is applied.

13. A computer program product in a non-transitory computer readable medium for use in a data processing system for performing privacy-preserving inferencing to detect fraud in real-time financial transactions, the computer program product storing computer program instructions that, when executed by the data processing system, are configured to:

provide at least one server in electronic communication with at least one client computing device using an electronic communication network to provide an online machine learning fraud detection service to the at least one client computing device, wherein the at least one client computing device comprises a transaction processing system to process real-time financial transactions at a high volume rate, wherein the real-time financial transactions are associated with at least one payment card account of a user of the at least one client computing device such that the at least one client computing device maintains a private user profile associated with the at least one payment card account of the user, wherein the real-time financial transactions are represented by non-private transaction data provided by the at least one client computing device, wherein the at least one server has electronic access to the non-private transaction data and to a database storing encrypted private user profile data, wherein the online machine learning fraud detection service is implemented in an untrusted environment with respect to the encrypted private user profile data, wherein the online machine learning fraud detection service comprises at least one processor configured to execute a first machine learning model and a second machine learning model for inferencing real-time fraud detection associated with the real-time financial transactions using different feature sets, wherein the second machine learning model is configured to implement an algorithm to perform fully homomorphic encryption (FHE)-based inferencing on a relatively small subset of the real-time financial transactions relative to the first machine learning model, wherein the computer program instructions, when executed by the data processing system, are further configured to:

receive the high volume rate of the real-time financial transactions from the at least one client computing device, wherein the real-time financial transactions are associated with corresponding encrypted private user profile data stored in the database;

perform, for respective transactions of the real-time financial transactions, a first inferencing using the first machine learning model that is trained on the non-private transaction data provided by the at least one client computing device;

detect, based on the first inferencing using the first machine learning model, that a given financial transaction in the real-time financial transactions needs additional fraud evaluation;

access, from the database, the encrypted private user profile data associated with the given transaction;

perform, for the given financial transaction that needs the additional fraud evaluation, a second inferencing in real-time using the second machine learning model, wherein the second machine learning model is trained on training non-private transaction data augmented with training encrypted private user profile data, wherein the second inferencing includes the FHE-based inferencing that analyzes the given transaction based on the corresponding encrypted private user profile data stored in the database associated with the user associated with the given transaction, wherein the FHE-based inferencing is performed on the given transaction in a privacy-preserving manner such that the online machine learning fraud detection service does not gain any knowledge of the encrypted private user profile data associated with the second inferencing;

transmit an encrypted output of the FHE-based inferencing to the at least one client computing device;

decrypt, by the at least one client computing device, the encrypted output of the FHE-based inferencing to determine whether the given financial transaction includes a given characteristic based on at least one feature of the second machine learning model associated with the corresponding encrypted private user profile data; and flag the given financial transaction based on determining that the given characteristic indicates a fraudulent transaction.

14. The computer program product as described in claim 13, wherein the real-time financial transactions include credit card transaction data, and wherein the first inferencing determines that the given financial transaction is a likely fraud.

15. The computer program product as described in claim 13, wherein the computer program instructions are further configured to train the first and second machine learning models.

16. The computer program product as described in claim 13, wherein the encrypted private user profile data is encrypted using a homomorphic encryption scheme.

17. The computer program product as described in claim 16, wherein the computer program instructions are further configured to:

query the database storing the encrypted private user profile data;

obtain a response, wherein the response includes the encrypted private user profile data that does not expose any private user data; and apply the second machine learning model on the given financial transaction and the response.

18. The computer program product as described in claim 13, wherein the first inferencing identifies a fraction of the real-time financial transactions against which the second inferencing is applied.

* * * * *